(12) United States Patent
Choe et al.

(10) Patent No.: US 7,141,318 B1
(45) Date of Patent: Nov. 28, 2006

(54) HIGH DENSITY LONGITUDINAL RECORDING MEDIA

(75) Inventors: Gunn Choe, San Jose, CA (US); Mingjun Yu, Mountain View, CA (US)

(73) Assignee: Maxtor Corporation, Longmont, CO (US)

(*) Notice: Subject to any disclaimer, the term of this patent is extended or adjusted under 35 U.S.C. 154(b) by 0 days.

(21) Appl. No.: 10/456,822

(22) Filed: Jun. 6, 2003

Related U.S. Application Data (60) Provisional application No. 60/416,733, filed on Oct. 7, 2002.

(51) Int. Cl.
*G11B 5/66* (2006.01)
*G11B 5/70* (2006.01)

(52) U.S. Cl. .................................................. 428/832.2

(58) Field of Classification Search .......... 428/694 TS, 428/694 TM, 336, 611, 667, 668, 900, 831, 428/832.2

See application file for complete search history.

(56) References Cited

U.S. PATENT DOCUMENTS

| | | | |
|---|---|---|---|
| 4,652,499 A | 3/1987 | Howard | 428/641 |
| 5,693,426 A | 12/1997 | Lee et al. | 428/611 |
| 5,900,324 A * | 5/1999 | Moroishi et al. | 428/611 |
| 6,187,408 B1 | 2/2001 | Bian et al. | 428/65.3 |
| 6,287,429 B1 | 9/2001 | Moroishi et al. | 204/192.2 |
| 6,361,859 B1 | 3/2002 | Cheng et al. | 428/336 |
| 6,403,241 B1 | 6/2002 | Chen et al. | 428/694 |
| 6,423,431 B1 | 7/2002 | Wong et al. | 428/694 |
| 2003/0148143 A1* | 8/2003 | Kanbe et al. | 428/694 TS |
| 2004/0037005 A1* | 2/2004 | Osawa | 360/135 |

* cited by examiner

*Primary Examiner*—Holly Rickman
(74) *Attorney, Agent, or Firm*—Marsh Fischmann & Breyfogle LLP (57) ABSTRACT

Magnetic recording media having improved magnetic properties such as an improved signal-to-noise ratio. The recording media includes a magnetic recording layer and an underlayer disposed beneath the magnetic recording layer. The underlayer is a Cr-based alloy such as CrMo that includes an additive selected from boron (B), silicon (Si) and boron nitride (BN). The additive preferentially segregates to the grain boundaries in the underlayer to reduce the grain size and grain size distribution in the underlayer.

26 Claims, 7 Drawing Sheets

HIGH DENSITY LONGITUDINAL RECORDING MEDIA

CROSS-REFERENCE TO RELATED APPLICATIONS

This application claims priority from U.S. Provisional Patent Application No. 60/416,733, filed Oct. 7, 2002, entitled "CrMoB Underlayer for High Density Longitudinal Recording Media" which is incorporated herein by reference in its entirety.

BACKGROUND OF THE INVENTION

1. Field of the Invention

The present invention relates to magnetic recording media having improved magnetic recording properties. In particular, the present invention relates to longitudinal (horizontal) recording media having an underlayer composed of a Cr-based alloy such as CrMo and an additive selected from B, Si and BN.

2. Description of Related Art

Thin film magnetic recording media are typically composed of multiple layers, including one or more magnetic recording layers, disposed on a rigid substrate. Traditionally, the magnetic layer includes magnetic grains that are grown vertically with the crystallographic c-axis (the easy magnetization axis) oriented longitudinally (i.e., in plane) with respect to the substrate.

The areal density of longitudinal magnetic recording media has been increasing at a compounded growth rate of about 60% per year and areal densities as high as 100 Gbit/in$^2$ have been demonstrated. However, further increases in areal densities are becoming difficult to achieve for a variety of reasons. One factor is the degradation of the signal-to-noise ratio (SNR) as the areal density increases. The SNR is a measure of the amplitude of the desired signal to the amplitude of the noise (i.e., undesired disturbances) and a high SNR is desirable. One way to increase the SNR is to decrease the noise. Low noise media can be achieved by reducing the magnetic grain size and/or narrowing the grain size distribution in the magnetic recording layer. Accordingly, it has become increasingly important to reduce the grain size and narrow the grain size distribution in order to further reduce media noise and increase the areal density of the media.

Due to the nature of epitaxial growth in thin film media, the properties of the magnetic layer can be controlled to some extent through proper selection of the layers underlying the magnetic layer. For example, it is known to use an underlayer disposed between the substrate and the magnetic layer in thin film recording media. The underlayer typically influences the crystalline structure, and hence the magnetic properties, of the overlying magnetic layer.

U.S. Pat. No. 4,652,499 by Howard discloses a magnetic recording medium including a magnetic layer and an underlayer. The magnetic layer is a CoPt or CoPtCr layer having a hexagonal-close packed structure (hcp) and the underlayer is a body-centered cubic (bcc) chromium-based alloy with a lattice cell constant greater than pure chromium, such as chromium-vanadium (CrV). The underlayer has a lattice cell constant that closely matches the lattice cell constant of the magnetic layer.

U.S. Pat. No. 5,900,324 by Moroishi et al. discloses a magnetic recording medium that includes two or more magnetic layers with one or more CrMo spacer layers between the magnetic layers. The medium also includes an underlayer in contact with a first magnetic layer, such as a CrMo alloy underlayer which may include other elements such as Zr, W, B, V, Nb, Ta, Fe, Ni, Re, Ce, Zn, P, Si, Ga, Hf, Al and Ti. It is disclosed that noise generation is suppressed by employing magnetic layers having a small thickness.

U.S. Pat. No. 6,287,429 by Moroishi et al. discloses a magnetic recording medium that includes a magnetic layer disposed on an intermediate layer. The intermediate layer includes chromium (Cr) and molybdenum (Mo) and the magnetic layer includes cobalt (Co) and platinum (Pt). It is disclosed that the intermediate layer may further include at least one element selected from the group consisting of tungsten (W), boron (B), vanadium (V), niobium (Nb), tantalum (Ta), iron (Fe), nickel (Ni), rhenium (Rh), copper (Cu), zirconium (Zr), zinc (Zn), phosphorus (P), silicon (Si), gallium (Ga), germanium (Ge), hafnium (Hf), aluminum (Al) and titanium (Ti). It is disclosed that the recording media has increased magnetic coercivity, leading to an increased areal density.

Despite the foregoing, there is a need for a magnetic recording medium including a magnetic recording layer having a reduced grain size and a narrow grain size distribution to enhance the magnetic properties of the recording layer, such as the areal density and the signal-to-noise ratio. It would also be advantageous if the magnetic recording layer had a high magnetic coercivity to further enhance the areal density.

BRIEF SUMMARY OF THE INVENTION

It is an object of the present invention to provide a magnetic recording medium having improved magnetic properties such as a high signal-to-noise ratio and increased areal density.

According to one embodiment of the present invention, a magnetic recording medium for longitudinal recording is provided. The magnetic recording medium includes a substrate upon which subsequent layers are deposited. The subsequent layers can include an underlayer disposed over the substrate where the underlayer includes a Cr-based alloy that further includes an additive selected from the group consisting of B, Si, BN and combinations thereof. The Cr-based alloy can include an alloying element selected from the group consisting of Mo, Ti, Mn, Ta, W, V, Zr, Nb, Hf, Al, Ru or combinations thereof. Preferably the alloying element is Mo. An intermediate layer can then be disposed over the underlayer and a magnetic layer is disposed over the intermediate layer.

The underlayer can include CrMo and B, CrMo and Si, CrMo and BN, or CrMo with a combination of B, Si, or BN. The underlayer can have an average thickness of from about 10 angstroms to about 140 angstroms, such as from about 20 angstroms to about 120 angstroms. The underlayer can include from about 10 atomic percent to about 20 atomic percent Mo and from about 3 atomic percent to about 10 atomic percent B, such as from about 4 atomic percent to about 8 atomic percent B.

The magnetic recording medium can also include a seedlayer disposed between the substrate and underlayer, such as a seedlayer having a body-centered cubic (bcc) crystalline structure and comprising Cr. The seedlayer can have an average thickness of from about 10 angstroms to about 100 angstroms. The magnetic layer can be an alloy such as a CoCrPt alloy, including a CoCrPtTa alloy or a CoCrPtB alloy. The intermediate layer can be a magnetic or non-magnetic layer and can have a hexagonal close packed (hcp)

crystalline structure. The intermediate layer can be a CoCr alloy or a CoCrTa alloy and can have an average thickness of from about 10 angstroms to about 50 angstroms.

A magnetic recording layer preferably has good magnetic properties, such as a remnant coercivity of at least about 3800 Oe, more preferably at least about 4000 Oe.

DESCRIPTION OF THE INVENTION

The present invention is directed to a magnetic recording medium, such as a magnetic tape or a magnetic hard disk. The magnetic recording medium includes a magnetic layer and an underlayer disposed beneath the magnetic layer, wherein the underlayer influences the grain structure and crystallographic properties of the magnetic layer, and improves the magnetic properties of the layer. Specifically, the magnetic recording layer can have a reduced grain size, a narrow grain size distribution and enhanced grain segregation. These improvements to the grain structure lead to improved magnetic properties, such as a higher signal-to-noise ratio, enabling the medium to have an increased areal density.

Figure 1:
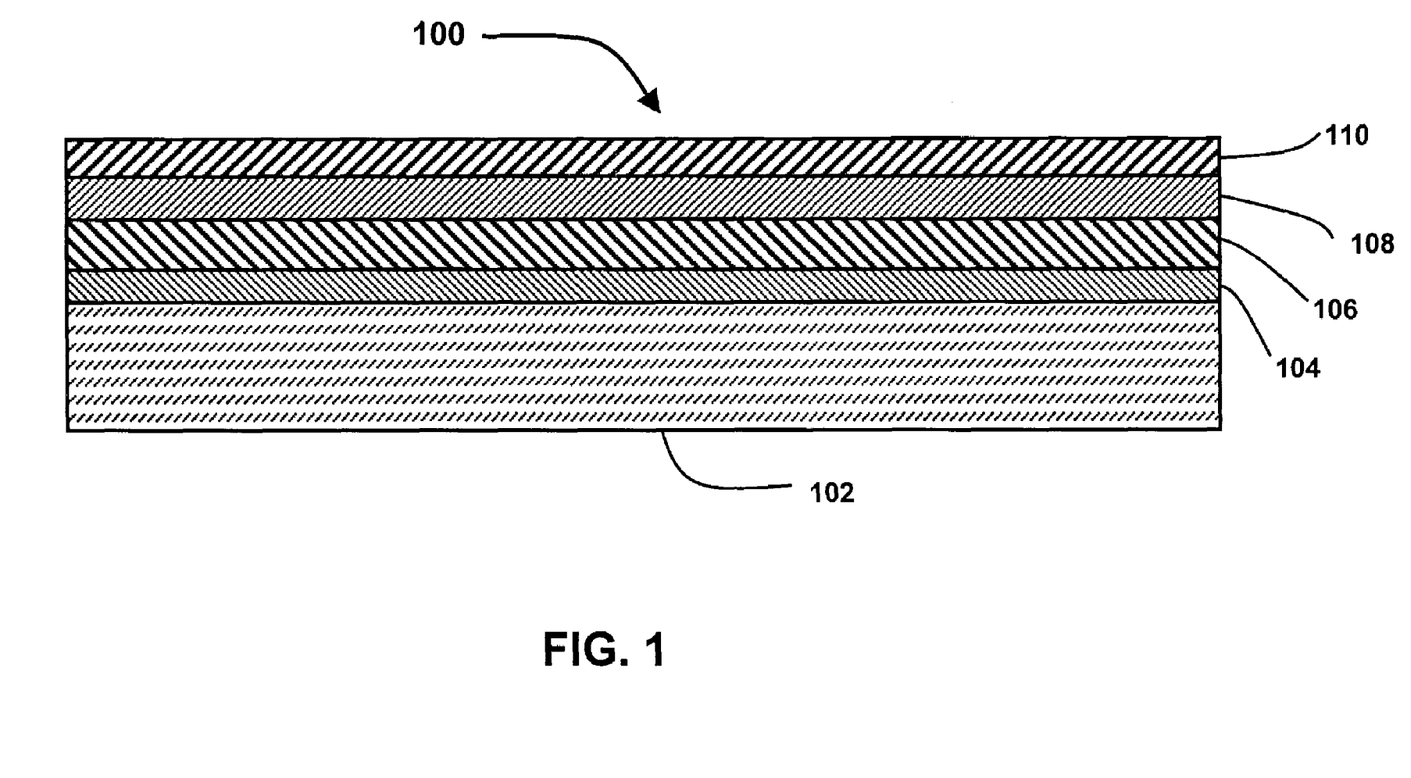
FIG. 1 illustrates a cross-sectional view of a layered magnetic recording medium according to an embodiment of the present invention

FIG. 1 illustrates a schematic view of a layered magnetic recording medium 100 according to an embodiment of the present invention, namely a magnetic hard disk. The magnetic recording medium 100 includes multiple layers that are deposited upon a rigid substrate 102. Among the layers formed on the rigid substrate 102 is a longitudinal magnetic recording layer 110. Disposed between the substrate 102 and the magnetic recording layer 110 is an underlayer 106 adapted to control the grain structure of the magnetic recording layer 110. A seedlayer 104 adapted to control the crystallographic properties of the underlayer 106 can also be provided, as well as an intermediate layer 108 disposed between the underlayer 106 and the magnetic recording layer 110. Through the use of this multi-layer structure, the longitudinal magnetic recording layer 110 can have significantly improved magnetic properties, enabling an increase in the areal density of the magnetic recording medium.

The rigid substrate 102 can be fabricated from a number of materials known to those skilled in the art to be useful for magnetic recording media such as hard disks. A particularly preferred material for the rigid substrate 102 according to the present invention is aluminum (Al), particularly an aluminum alloy (e.g., AlMg), coated (e.g., electroplated) with a layer of amorphous nickel phosphorous (NiP). However, it will be appreciated that the rigid substrate can also be fabricated from other materials, such as glass and glass-containing materials, including glass-ceramics. The rigid substrate 102 typically has an average thickness in the range of from about 10 mils to 75 mils (about 0.254 mm to 1.9 mm) and has a smooth surface upon which the remaining layers can be deposited.

According to the present invention, a seedlayer 104 can optionally be provided between the substrate 102 and the underlayer 106 to control the grain structure and crystallographic orientation of the underlayer 106. Thus, the seedlayer 104 is disposed directly beneath and in contact (coupled) with the underlayer 106. According to the present invention, the seedlayer preferably has a body-centered cubic (bcc) crystalline structure and comprises chromium (Cr). For example, the seedlayer can be formed from substantially pure Cr or a Cr alloy. Preferably, the seedlayer includes at least about 80 at. % (atomic percent) Cr, more preferably at least about 90 at. % Cr and most preferably at least about 99 at. % Cr. In one preferred embodiment, the seedlayer consists essentially of Cr.

The seedlayer 104 preferably has an average thickness of at least about 10 angstroms and not greater than about 100 angstroms and a preferred range is from about 40 angstroms to about 80 angstroms. The seedlayer 104 advantageously enhances the crystal growth of the underlayer 106 deposited and grown on the seedlayer.

An underlayer 106 is disposed between the substrate 102 and the magnetic layer 110. The underlayer 106 is adapted to control the grain structure of the longitudinal magnetic layer 110 disposed above the underlayer. The underlayer according to the present invention has a bcc crystalline structure and preferably includes a Cr-based alloy. As used herein, a Cr-based alloy is one that includes at least about 50 at. % Cr. The alloying element in the Cr-based alloy can be selected from the group consisting of Mo, Ti, Mn, Ta, W, V, Zr, Nb, Hf, Al, Ru and combinations thereof. The total amount of alloying element is preferably from about 10 at. % to about 20 at. %.

Among the foregoing, a CrMo alloy is particularly preferred and the CrMo alloy preferably includes from about 10 at. % to about 20 at. % Mo. Although the following description refers to a CrMo alloy, it will be appreciated that one or more of the foregoing alloying elements can be substituted, in whole or in part, for the Mo.

The underlayer also includes an additive that preferentially segregates to the CrMo grain boundaries. Therefore, the additive should have a low solubility in the CrMo alloy, such as not greater than about 1 at. %. Preferably, the additive is selected from B, Si, BN (boron nitride) and combinations thereof. Boron is particularly preferred as the additive, thereby forming a CrMoB underlayer. According to a preferred embodiment, the total atomic percent of B, Si and/or BN in the CrMo underlayer is from about 3 at. % to about 10 at. %. Below about 3 at. %, the beneficial effect of the additive on the magnetic layer diminishes and above about 10 at. % the coercivity of the magnetic layer begins to degrade. According to a particularly preferred embodiment, the additive is included in an amount of from about 4 at. % to about 8 at. %.

As is discussed above, the additive preferentially segregates in the grain boundaries among the CrMo grains, although it will be appreciated that small amounts of the additive may be present within the CrMo grains. The presence of the additive in the grain boundary advantageously limits the grain growth of the CrMo grains, leading to a reduced grain size and a narrow grain size distribution in the underlayer 106, and also in the magnetic layer 110. While not wishing to be bound by any theory, it is believed that secondary phases, such as $Cr_2B$ when B is the additive, are formed at the CrMo grain boundaries, restricting grain growth and improving grain segregation.

The average thickness of the underlayer 106 is preferably at least about 10 angstroms and preferably does not exceed about 200 angstroms. In a preferred embodiment, the average thickness of the underlayer is from about 20 angstroms to about 120 angstroms and more preferably is not greater than about 100 angstroms, such as from about 20 angstroms to about 100 angstroms. If the thickness of the underlayer exceeds about 200 angstroms, the average grain size in the underlayer can become too large. Optimal grain size and magnetic properties can be achieved using an underlayer thickness of not greater than about 100 angstroms. Preferably, the underlayer 106 has an average grain size of not greater than about 12 nanometers.

Although illustrated in FIG. 1 as a single underlayer, the magnetic recording media of the present invention can include a double underlayer. According to this embodiment, the underlayer structure can include an upper layer (a crystallographic growth enhancement layer) of CrMo with an additive as described above, and also a lower layer of CrMo directly beneath and contacting the upper layer, to form a double underlayer. In this embodiment, the lower layer enhances the texture (alignment) of the magnetic layer crystals whereas the upper layer controls the grain size and grain segregation of the magnetic layer. Additives such as B, Si or BN can also be included in the lower layer, provided that the total amount of these additives is less in the lower layer than in the upper layer. For example, the upper layer can include at least about 5 at. % additives and the lower layer less than 5 at. % additives. When a double underlayer is utilized, the total thickness of the double underlayer preferably falls within the thickness parameters described above for a single underlayer.

According to the present invention, an intermediate layer 108 having a hexagonal close-packed (hcp) crystalline structure can be disposed between the underlayer 106 and the magnetic recording layer 110 and is preferably coupled with both the underlayer 106 and the magnetic recording layer 110. The intermediate layer 108 can be a magnetic layer or a non-magnetic layer and preferred materials for the intermediate layer 108 include CoCr (non-magnetic) and CoCrTa (magnetic). The intermediate layer 108 preferably has a thickness of from about 10 angstroms to about 50 angstroms and provides a transition from the bcc structure of the underlayer to the hcp structure of the magnetic recording layer and promotes better crystal growth.

The magnetic recording layer 110 is deposited over the intermediate layer 108 and the underlayer 106. The magnetic recording layer 110 preferably has an easy magnetization axis that is oriented parallel with the surface of the magnetic recording layer 110. Useful materials for the magnetic recording layer 110 include cobalt-based alloys having an hcp crystalline structure. Cobalt can be alloyed with elements such as chromium (Cr), platinum (Pt), boron (B), niobium (Nb), tungsten (W), tantalum (Ta), copper (Cu) and silver (Ag). In one preferred embodiment, the magnetic recording layer 110 includes cobalt alloyed with chromium, platinum and boron (CoCrPtB). This alloy has a very low magnetic exchange coupling, further reducing media noise. According to one particularly preferred embodiment of the present invention, the magnetic layer includes a cobalt alloy comprising 10 at. % to 30 at. % Cr, 8 at. % to 20 at. % Pt and 0 at. % to 30 at. % B, the balance consisting essentially of Co. The magnetic recording layer 110 preferably has an average thickness of not greater than about 200 angstroms, such as from about 100 to about 200 angstroms. It will be appreciated by those skilled in the art that multiple magnetic recording layers having different compositions can be utilized, and in a preferred embodiment at least two magnetic layers are used. However, it is preferred that the magnetic layers are coupled, i.e., that they are in direct contact and no spacer layer is disposed between the magnetic layers. When more than one magnetic recording layer is utilized, it is preferred that the total thickness of the magnetic recording layers is within the parameters described above for a single magnetic layer.

The magnetic recording layer 110 preferably has an average grain size of not greater than about 9 nanometers and more preferably not greater than about 8 nanometers. The magnetic grains are also well segregated, preferably having an average grain boundary thickness of at least about 1 nanometer.

The longitudinal magnetic recording medium 100 can also include one or more protective layer(s) (not illustrated) such as a protective carbon layer and a lubricant layer disposed over the protective layer. These layers are adapted to reduce damage from the read/write head interactions with the recording medium during start/stop operations of the disk drive.

The foregoing layers can be deposited on the substrate using known deposition techniques. For example, deposition of the layers onto the substrate can be accomplished by physical vapor deposition, e.g., sputtering. Sputtering can be accomplished using gases such as Ar, Kr or Xe. For the fabrication of the various layers on the substrate, it is preferred to sputter at a pressure of from about 2 mtorr to about 60 mtorr. The substrate can be heated prior to sputtering and can be annealed after one or more of the layers have been deposited to relieve residual stresses. A bias voltage of from about 0 to about −300 volts can also be applied to enhance the grain structure of the various layers.

The magnetic recording medium according to the present invention has significantly improved properties, including an improved signal-to-noise ratio (SNR). The SNR improvement results from low media noise as well as increased magnetic in-plane anisotropy along the recording direction. The underlayer according to the present invention decreases media noise and increases magnetic in-plane anisotropy by reducing grain size and by enhancing grain segregation in the magnetic layer. In addition, the in-plane orientation ratio (OR) of the magnetic layer is enhanced. The OR is a measure of how well the c-axis (easy magnetization axis) of the magnetic grains is aligned in the longitudinal direction and a high OR is desirable. A high OR reduces medium noise, thereby increasing the SNR. According to one embodiment of the present invention, the magnetic layer has an OR of at least about 1.5. While not wishing to be bound by any theory, it is believed that the enhanced OR in the magnetic layers according to the present invention is associated with the improved grain boundary segregation in the magnetic layer.

The magnetic recording medium can also have a high remnant coercivity ($H_{cr}$). Preferably, the remnant coercivity is at least about 3800 Oe, more preferably is at least about 4000 Oe and even more preferably is at least about 4200 Oe. High $H_{cr}$ values lead to increased areal density for the recording medium Another important parameter is the magnetic remnant thickness product ($M_r t$). The $M_r t$ is obtained by multiplying the remnant magnetization ($M_r$) times the thickness (t) of the magnetic layer. The $M_r t$ is a measure of the amplitude of the signal read by the read/write head during operation of the device. As areal density increases, the $M_r t$ should be decreased proportionally so the transitions between the closely spaced bits are sharp enough to be read accurately. The $M_r t$ for the magnetic layer of the present invention preferably ranges from 0.25 to 0.55 memu/cm$^2$, more preferably from 0.35 to 0.45 memu/cm$^2$.

EXAMPLES

The following samples were fabricated by sputtering on textured Al/NiP substrates using an Intevac MDP 250B system (Intevac Inc., Santa Clara, Calif.). Unless otherwise specified, the samples included a Cr seedlayer, a CrMo-based underlayer, a CoCr intermediate layer, two CoCrPtB magnetic layers with different compositions, and a carbon overcoat that were sputtered to form the media. For some samples, only the seedlayer and the underlayer were sputtered for structural analysis of the underlayer by x-ray diffraction (XRD) and transmission electron microscopy (TEM). The magnetic properties were characterized on a vibrating sample magnetometer (VSM) and recording performance was measured on a Guzik spin stand using a GMR head at 5400 rpm.

Figure 2:
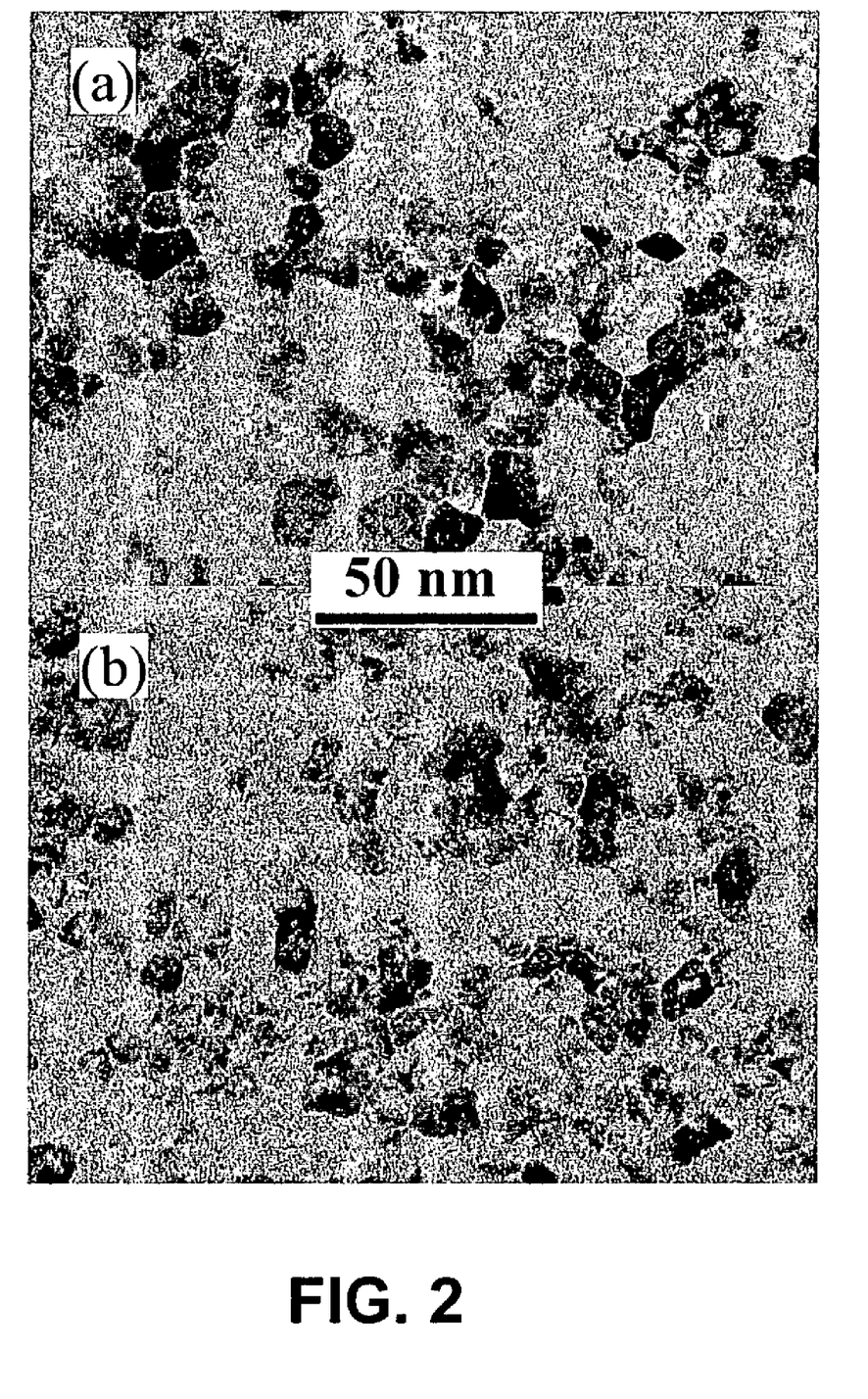
FIGS. 2a and 2b illustrate TEM micrographs of a $Cr_{80}Mo_{20}$ underlayer (FIG. 2a) and a $Cr_{80}Mo_{15}B_5$ underlayer (FIG. 2b).

FIG. 2 illustrates TEM micrographs of a $Cr_{80}Mo_{20}$ underlayer (FIG. 2a) and a $Cr_{80}Mo_{15}B_5$ underlayer (FIG. 2b). The average grain size of the $Cr_{80}Mo_{15}B_5$ underlayer is about 9.9 nanometers and the average grain size of the $Cr_{80}Mo_{20}$ underlayer is about 11.4 nanometers. Thus, 5 at. % B was effective for reducing the average grain size of the underlayer by about 12 percent. Further, the grains in $Cr_{80}Mo_{15}B_5$ underlayer appear to be segregated by a secondary phase whereas the grains in the $Cr_{80}Mo_{20}$ underlayer appear to be in direct contact. The reduced grain size and the introduction of grain segregation at the grain boundaries in the $Cr_{80}Mo_{15}B_5$ underlayer will significantly improve the media performance by reducing the average grain size and enhancing grain segregation in the magnetic layer.

Figure 3:
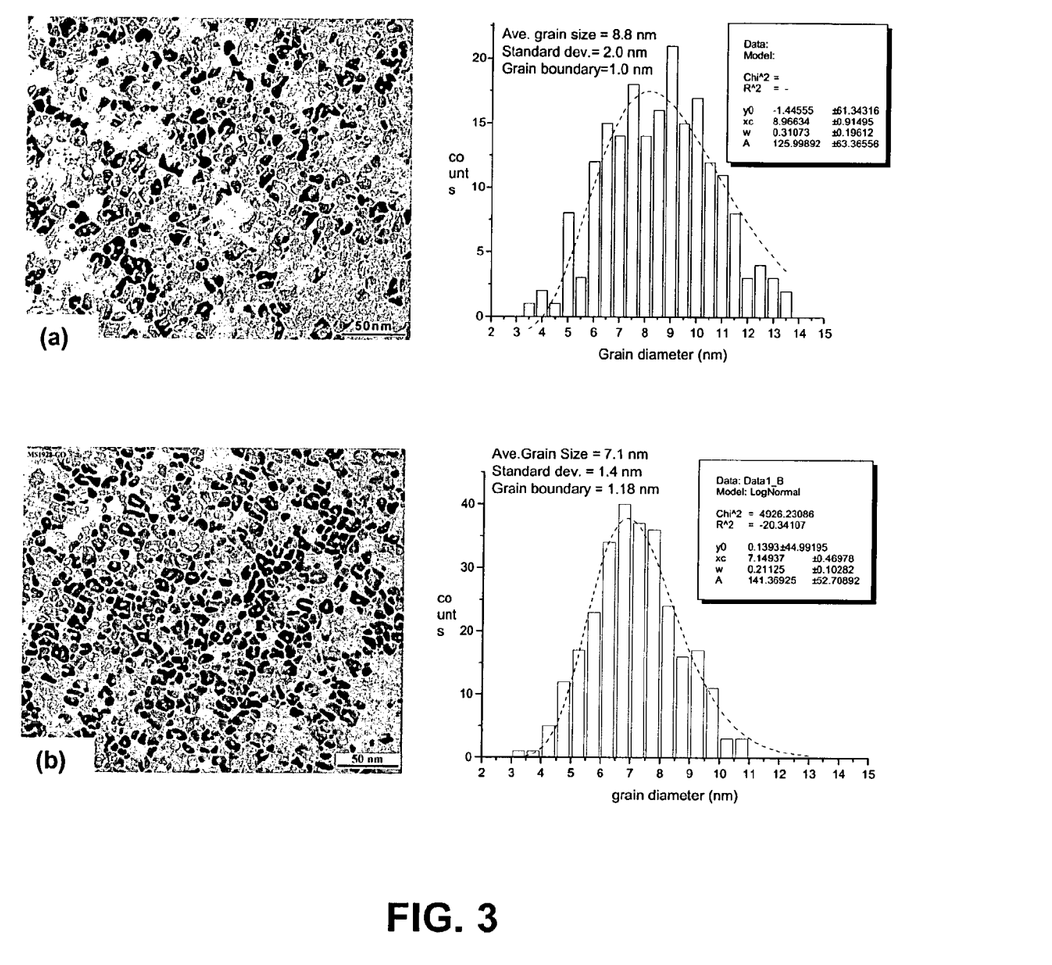
FIGS. 3a and 3b illustrate TEM micrographs of CoCrPt magnetic layers deposited onto a CrMo underlayer (FIG. 3a) and onto a CrMoB underlayer (FIG. 3b).

FIG. 3 illustrates TEM micrographs of media with two CoCrPt magnetic layers deposited onto a $Cr_{80}Mo_{20}$ underlayer (FIG. 3a) and onto a $Cr_{80}Mo_{15}B_5$ underlayer (FIG. 3b), both with a Cr seedlayer. The grain size and grain size distribution in the magnetic layer are reduced by using a CrMoB underlayer as compared to a CrMo underlayer. The CoCrPt magnetic layer with CrMo underlayer (FIG. 3a) is calculated to have an average grain size of 8.8 nanometers with a standard deviation of 2.0 nanometers, and an average grain boundary thickness of 1.0 nanometers. The magnetic layer with a CrMoB underlayer (FIG. 3b) is calculated to have an average grain size of 7.1 nanometers (almost a 20% decrease) with a standard deviation of 1.4 nanometers, and an average grain boundary thickness of 1.2 nanometers. Thus, the CrMoB underlayer was effective for reducing the average grain size and grain size distribution of the magnetic layer and enhancing the grain segregation.

A set of further examples were prepared to evaluate the selection of the additive for the CrMo underlayer and the results are illustrated in FIGS. 4–7. Specifically, a number of samples were prepared utilizing underlayers consisting of CrMo (specifically $Cr_{80}Mo_{20}$), CrMoHf (specifically $Cr_{81}Mo_{17}Hf_2$), CrMoW (specifically $Cr_{80}Mo_{15}W_5$) and CrMoRu (specifically $Cr_{80}Mo_{15}Ru_5$) which were compared to CrMoSi (specifically $Cr_{80}Mo_{17}Si_3$) and CrMoB (specifically $Cr_{80}Mo_{15}B_5$) underlayers of the present invention.

Figure 4:
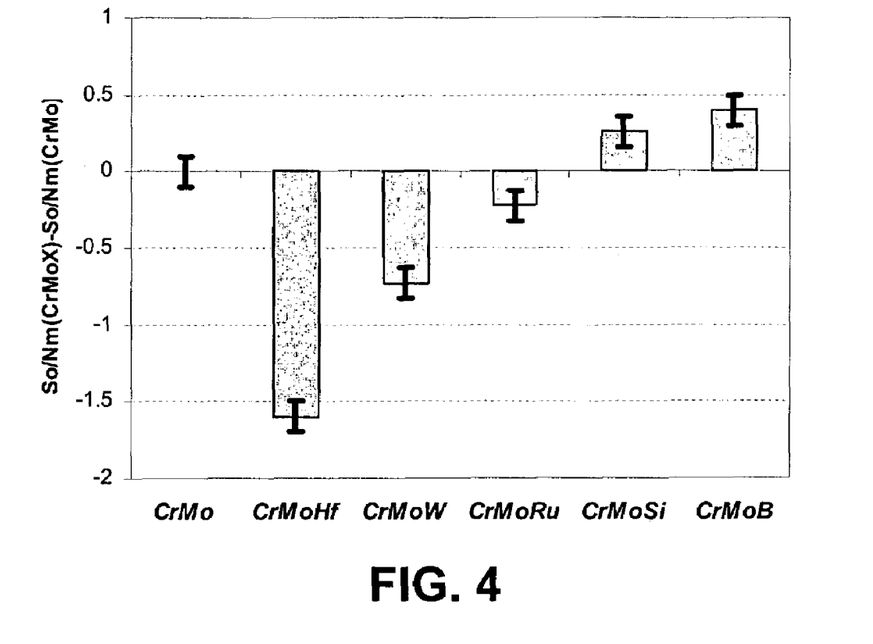
FIG. 4 illustrates the isolated signal-to-noise ratio ($S_o/N_m$) measured for magnetic recording media having different underlayer compositions.

FIG. 4 illustrates the change in isolated signal-to-noise ratio ($S_o/N_m$) resulting from different additives to the CrMo underlayer normalized with respect to a CrMo underlayer. The data in FIG. 4 was collected at 690 kFCl (flux changes per inch). As is illustrated in FIG. 4, the CrMoSi underlayer increased the $S_o/N_M$ ratio by about 0.3 dB as compared to a CrMo layer. The use of a CrMoB underlayer further increased the $S_o/N_M$ ratio by about 0.15 dB. Using Hf, W and Ru in the underlayer decreased the $S_o/N_m$ ratio compared to CrMo with no additive.

Figure 5:
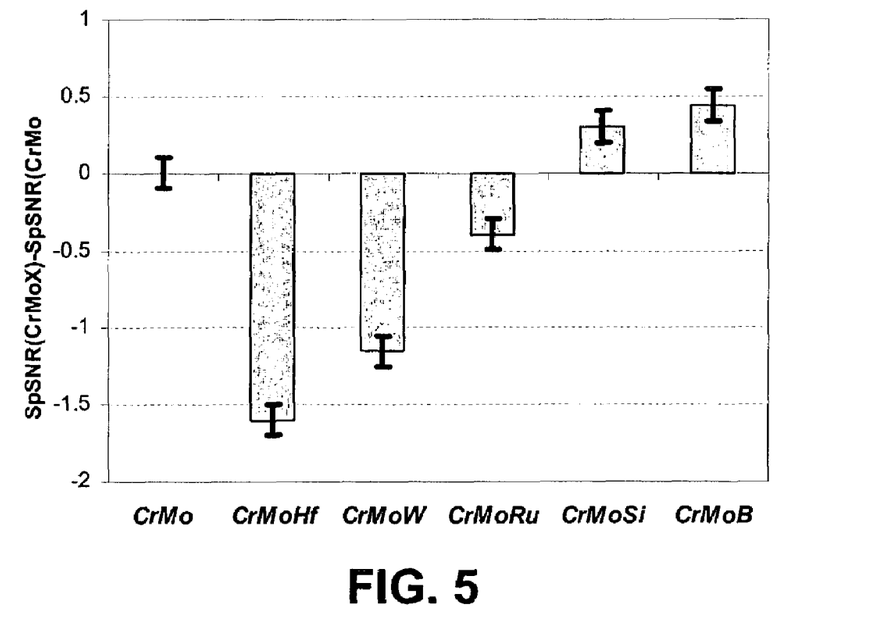
FIG. 5 illustrates the spectral signal-to-noise ratios ($S_p$SNR) for magnetic recording media having different underlayer compositions.

FIG. 5 illustrates the spectral SNR($S_p$SNR, with the noise including media, electronic and dc noise) for different underlayers at 345 kFCl normalized with respect to a CrMo underlayer. A $S_p$SNR increase of about +0.3 dB is achieved with a CrMoSi underlayer and a $S_p$SNR increase of about +0.4 dB is achieved using a CrMoB underlayer. Other elements are not effective for improving the $S_p$SNR, and, in fact, decreased the $S_p$SNR as compared to CrMo with no additives.

Figure 6:
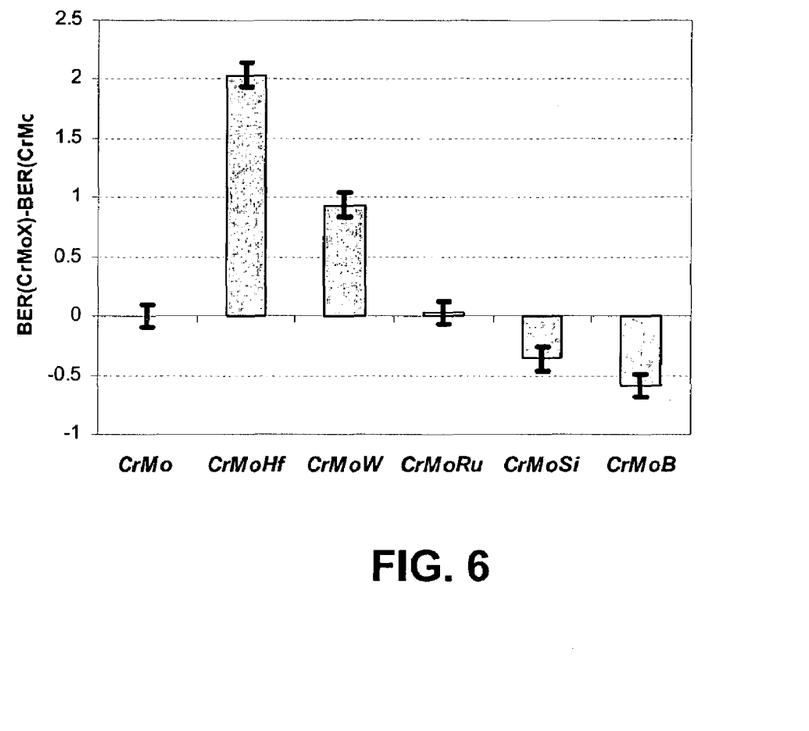
FIG. 6 illustrates the bit error rate (BER) for magnetic recording media having different underlayer compositions.

FIG. 6 illustrates the bit error rate (BER) of media utilizing different underlayer compositions at 690 kFCl normalized with respect to CrMo. The BER is measured by writing bits to the magnetic layer and subsequently reading the bits to determine how many bits cannot be read back correctly. The data in FIG. 6 is measured on a log scale. For example, if the BER for CrMo was $1 \times 10^{-6}$, then the BER for the CrMoHf example is about $1 \times 10^{-4}$ and for CrMoB is less than $1 \times 10^{-6.5}$. The improvement in BER for the media with a CrMoSi or CrMoB underlayer as compared to other underlayers is evident. The BER performance is well correlated to the $S_p$SNR results (FIG. 5).

Figure 7:
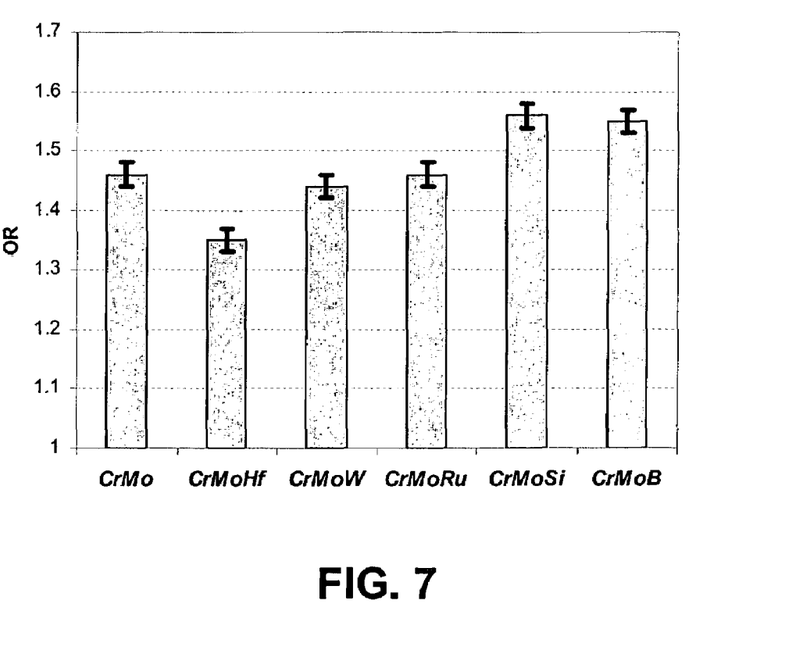
FIG. 7 illustrates the in-plane orientation ratio (OR) for magnetic recording media having different underlayer compositions.

FIG. 7 illustrates the in-plane orientation ratio (OR) for the different underlayer compositions. The CrMoSi and CrMoB underlayers shows the highest OR, each being greater than 1.5. As a result of the high OR, magnetic media with CrMoSi and CrMoB underlayers will have a narrow switching field distribution, narrow signal pulse width ($PW_{50}$) and high $S_p$SNR.

Figure 8:
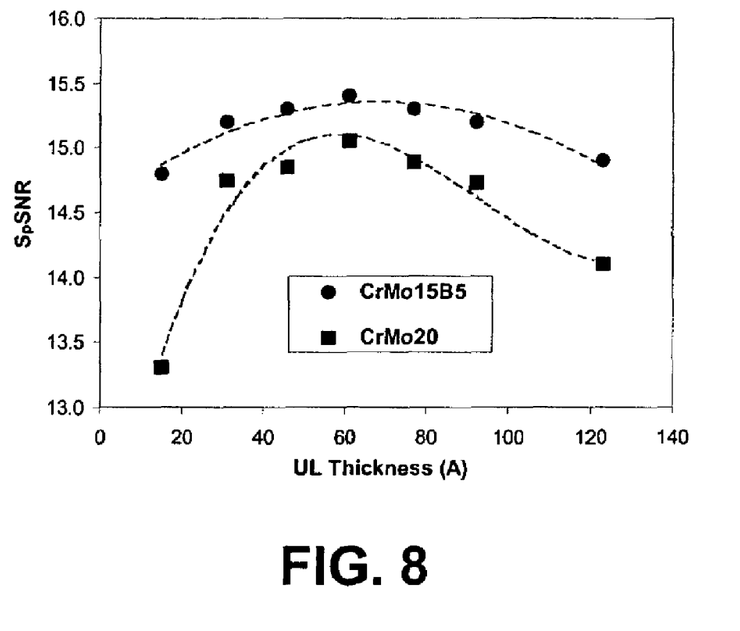
FIG. 8 illustrates the $S_p$SNR for magnetic recording media having different underlayer compositions as a function of underlayer thickness.

FIG. 8 illustrates the $S_p$SNR of media with a $Cr_{80}Mo_{15}B_5$ underlayer and a $Cr_{80}Mo_{20}$ underlayer as a function of underlayer thickness. For both materials, $S_p$SNR peaks at an underlayer thickness of about 60 angstroms. Although the $PW_{50}$ is slightly wider, the $S_p$SNR is at least 0.5 dB better for media with a $Cr_{80}Mo_{15}B_5$ underlayer over a range of underlayer thickness. For the $Cr_{80}Mo_{15}B_5$ underlayer, the $S_p$SNR is also less sensitive to changes in the underlayer thickness.

Figure 9:
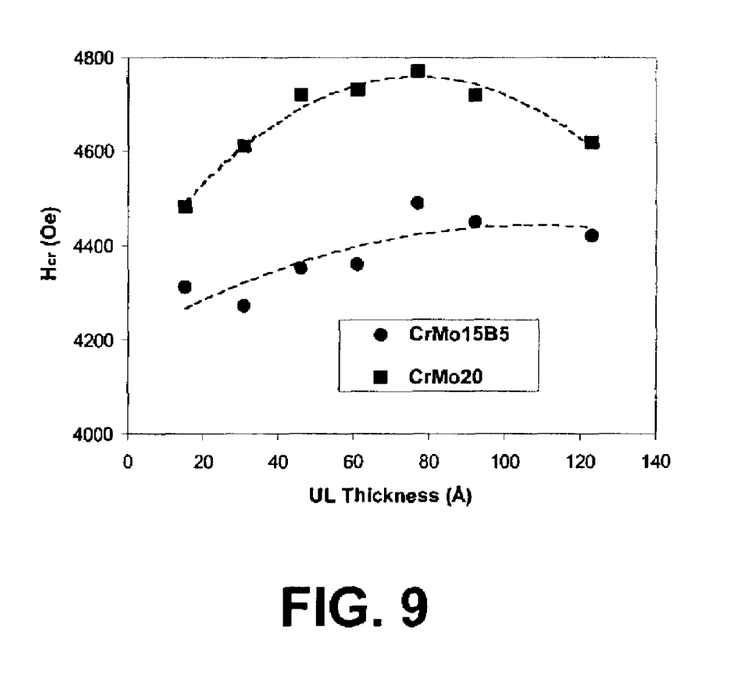
FIG. 9 illustrates the remnant coercivity ($H_{cr}$) for magnetic recording media having different underlayer compositions as a function of underlayer thickness.

FIG. 9 illustrates the remnant coercivity ($H_{cr}$) for magnetic media having a $Cr_{80}Mo_{15}B_5$ underlayer or a $Cr_{80}Mo_{20}$ underlayer as a function of underlayer thickness. The $H_{cr}$ for media with a $Cr_{80}Mo_{15}B_5$ underlayer was about 300 Oe lower than the media with a $Cr_{80}Mo_{20}$ underlayer sputtered under substantially the same conditions. It was found that the Co(11.0) peak intensity and width was equivalent for both magnetic layers. Therefore, the reduction of $H_{cr}$ can be attributed to a smaller magnetic grain size. Nonetheless, the $H_{cr}$ of the media according to the present invention is quite high, well above 4200 Oe.

Figure 10:
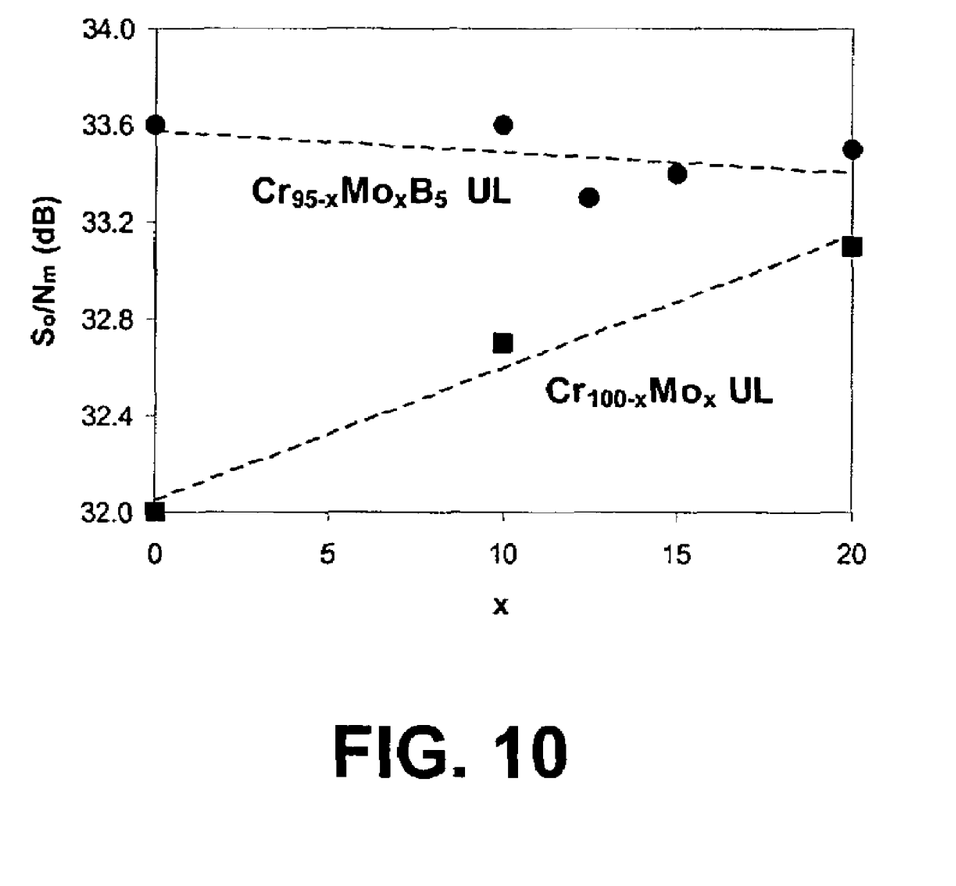
FIG. 10 illustrates the $S_o/N_m$ for magnetic recording media having different underlayer compositions.

FIG. 10 illustrates the $S_o/N_m$ measured at 650 kFCl of media with a 60 angstrom thick underlayer of $Cr_{95-x}Mo_xB_5$ or $Cr_{100-x}Mo_x$), as a function of x. FIG. 10 illustrates that the media of the present invention have at least 0.4 dB higher $S_o/N_m$ than media having a CrMo underlayer. This further indicates a reduced grain size and improved grain segregation in the magnetic layer according to the present invention.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A magnetic recording medium, comprising:
   a) a substrate;
   b) an underlayer disposed over said substrate, said underlayer comprising a Cr-based alloy comprising Mo as an alloying element and an additive selected from the group consisting of B, Si, BN and combinations thereof;
   c) an intermediate layer disposed over and coupled with said underlayer; and
   d) a magnetic recording layer disposed over and coupled with said intermediate layer.

2. A magnetic recording medium as recited in claim 1 wherein said underlayer comprises CrMo and B.

3. A magnetic recording medium as recited in claim 1, wherein said underlayer comprises CrMo and BN.

4. A magnetic recording medium as recited in claim 1, wherein said underlayer comprises CrMo and Si.

5. A magnetic recording medium as recited in claim 1, wherein said underlayer comprises CrMo, B and Si.

6. A magnetic recording medium as recited in claim 1, wherein said underlayer has an average thickness of from about 10 angstroms to about 140 angstroms.

7. A magnetic recording medium as recited in claim 1, wherein said underlayer has an average thickness of from about 20 angstroms to about 120 angstroms.

8. A magnetic recording medium as recited in claim 1, wherein said underlayer comprises from about 10 at. % to about 20 at. % Mo.

9. A magnetic recording medium as recited in claim 1, wherein said underlayer comprises from about 3 at. % to about 10 at. % B.

10. A magnetic recording medium as recited in claim 1, wherein said underlayer comprises from about 4 at. % to about 8 at. % B.

11. A magnetic recording medium as recited in claim 1, wherein said underlayer is a double underlayer.

12. A magnetic recording medium as recited in claim 1, further comprising a seedlayer having a body-centered cubic (bcc) crystalline structure disposed between said substrate and said underlayer.

13. A magnetic recording medium as recited in claim 12, wherein said seedlayer comprises Cr.

14. A magnetic recording medium as recited in claim 12, wherein said seedlayer has an average thickness of from about 10 angstroms to about 100 angstroms.

15. A magnetic recording medium as recited in claim 1, wherein said magnetic recording layer comprises a CoCrPt alloy.

16. A magnetic recording medium as recited in claim 15, wherein said CoCrPt alloy further comprises Ta.

17. A magnetic recording medium as recited in claim 15, wherein said CoCrPt alloy further comprises B.

18. A magnetic recording medium as recited in claim 1, wherein said intermediate layer is a magnetic intermediate layer.

19. A magnetic recording medium as recited in claim 1, wherein said intermediate layer is a non-magnetic intermediate layer.

20. A magnetic recording medium as recited in claim 1, wherein said intermediate layer has a hexagonal close packed (hcp) crystalline structure.

21. A magnetic recording medium as recited in claim 1, wherein said intermediate layer comprises a CoCr alloy.

22. A magnetic recording medium as recited in claim 1, wherein said intermediate layer comprises a CoCrTa alloy.

23. A magnetic recording medium as recited in claim 1, wherein said intermediate layer has an average thickness of from about 10 angstroms to about 50 angstroms.

24. A magnetic recording medium as recited in claim 1, wherein said substrate comprises aluminum coated with NiP.

25. A magnetic recording medium as recited in claim 1, wherein said magnetic layer has a remnant coercivity ($H_{cr}$) of at least about 3800 Oe.

26. A magnetic recording medium as recited in claim 1, wherein said magnetic layer has a remnant coercivity ($H_{cr}$) of at least about 4000 Oe.

* * * * *